(12) United States Patent
Bauer et al.

(10) Patent No.: US 7,784,595 B2
(45) Date of Patent: Aug. 31, 2010

(54) INTEGRATED CLUTCH ASSEMBLY DAMPER ARRANGEMENT

(75) Inventors: Karl-Heinz Bauer, Troy, MI (US); Hans-Jürgen Hauck, Schwäbisch Hall (DE); Thomas E. Braford, Jr., Brighton, MI (US); Till Ebner, Seeheim (DE)

(73) Assignee: BorgWarner Inc., Auburn Hills, MI (US)

( * ) Notice: Subject to any disclaimer, the term of this patent is extended or adjusted under 35 U.S.C. 154(b) by 588 days.

(21) Appl. No.: 11/703,425

(22) Filed: Feb. 7, 2007

(65) Prior Publication Data

US 2007/0205070 A1 Sep. 6, 2007

Related U.S. Application Data

(60) Provisional application No. 60/772,718, filed on Feb. 13, 2006.

(51) Int. Cl.
*F16D 7/00* (2006.01)
*F16D 23/00* (2006.01)
*F16D 43/20* (2006.01)
*F16D 3/00* (2006.01)
*F16F 15/121* (2006.01)

(52) U.S. Cl. .................................. 192/55.61; 464/68.8
(58) Field of Classification Search .............. 192/55.61; 464/68.4, 68.8
See application file for complete search history.

(56) References Cited

U.S. PATENT DOCUMENTS

| | | | |
|---|---|---|---|
| 5,558,579 A | 9/1996 | Tsuchiya et al. | |
| 5,680,918 A * | 10/1997 | Reik et al. ................. | 192/55.1 |
| 5,707,292 A | 1/1998 | Koda et al. | |
| 6,360,861 B1 | 3/2002 | Sumi et al. | |
| 6,401,894 B1 * | 6/2002 | Merkel et al. ............... | 192/48.9 |
| 6,481,552 B1 | 11/2002 | Fukushima | |
| 6,695,108 B1 | 2/2004 | Hanke et al. | |
| 7,264,101 B2 * | 9/2007 | Hauck et al. ............. | 192/55.61 |
| 2002/0011391 A1 | 1/2002 | Kroll et al. | |
| 2002/0153221 A1 | 10/2002 | Schnepf | |
| 2004/0200300 A1 | 10/2004 | Ahrens | |
| 2005/0020365 A1* | 1/2005 | Bastel et al. ................... | 464/68 |
| 2005/0026704 A1 | 2/2005 | Kroll et al. | |

FOREIGN PATENT DOCUMENTS

DE 101 15 454 8/2002

\* cited by examiner

*Primary Examiner*—Tisha D Lewis
(74) *Attorney, Agent, or Firm*—Warn Partners, P.C.

(57) ABSTRACT

A clutch assembly and damper arrangement is provided that includes a driver hub and a driven element coupled to the driver hub by a compliance element. A clutch is provided that is selectively engageable to the driven element. The clutch has a housing supporting the compliance element and is torsionally unitary with the driven element.

6 Claims, 3 Drawing Sheets

INTEGRATED CLUTCH ASSEMBLY DAMPER ARRANGEMENT

CROSS-REFERENCE TO RELATED APPLICATIONS

This application claims the benefit of U.S. Provisional Application No. 60/772,718, filed Feb. 13, 2006.

FIELD OF THE INVENTION

The present invention relates to clutch assembly and damper arrangements. Especially clutch assembly and damper arrangements used in dual input shaft automatic transmissions.

BACKGROUND OF THE INVENTION

It is desirable to make the clutch assembly and damper arrangement fit in as small a package as possible while at the same time simplifying assembly and reducing cost.

SUMMARY OF THE INVENTION

To make manifest the above noted and other manifold desires, the present invention provides a clutch assembly and damper arrangement wherein the clutch housing is integrated into the damper allowing the total arrangement to be placed in a smaller package.

Other features of the invention will become more apparent to those skilled in the art as the invention is further revealed in the accompanying drawings and Detailed Description of the Invention.

BRIEF DESCRIPTION OF THE DRAWINGS

FIG. 4 is a side elevational view of the clutch assembly and damper arrangement shown in FIGS. 1-3 with portions removed for clarity of illustration.

DETAILED DESCRIPTION OF THE INVENTION

Figure 1:
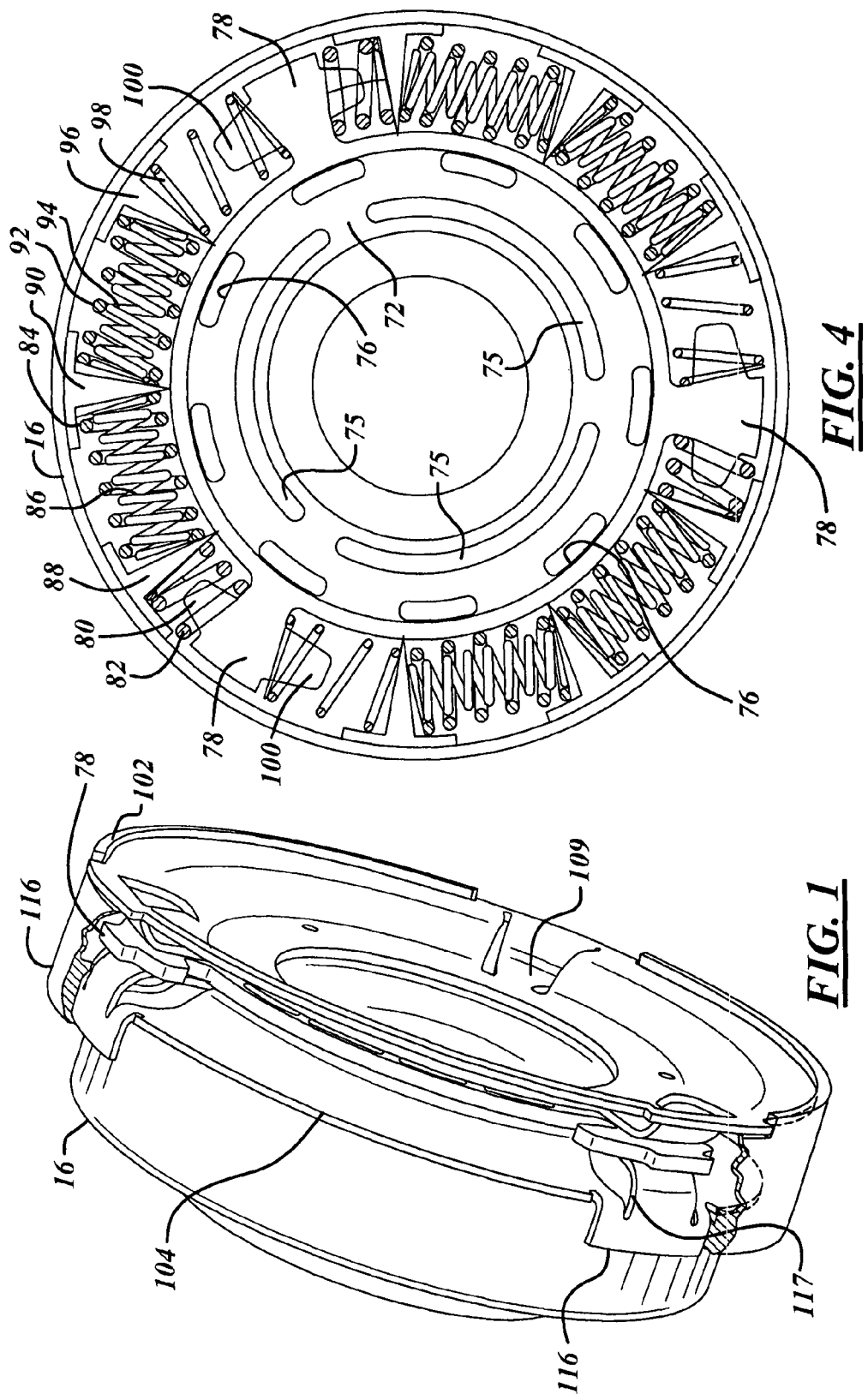
FIG. 1 is perspective view of a preferred embodiment clutch assembly and damper arrangement of the present invention with portions removed for clarity of illustration.
Figure 2:
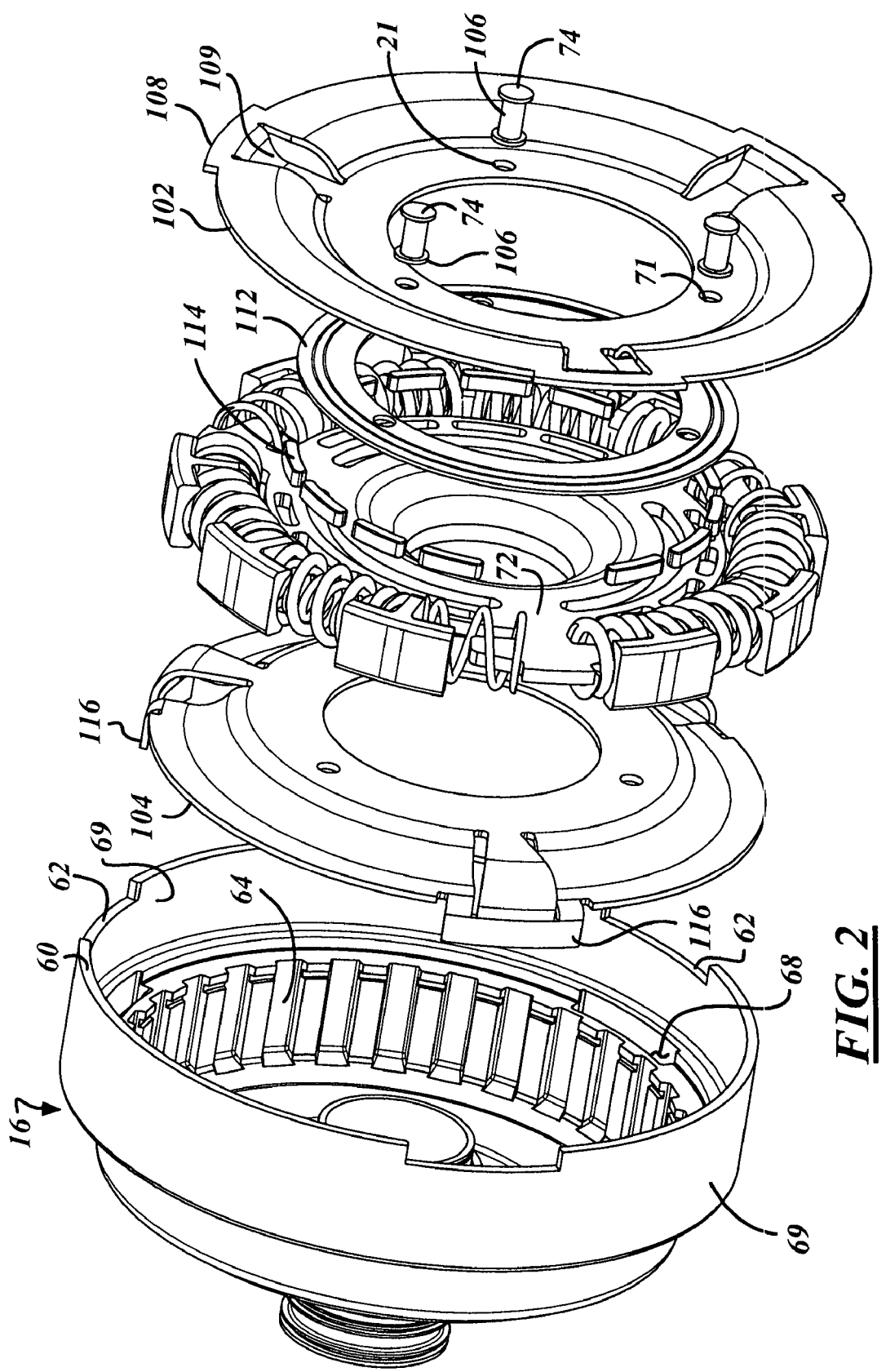
FIG. 2 is an exploded view of the clutch assembly and damper arrangement shown in FIG. 1 with portions of the clutch assembly removed for clarity of illustration.

Referring to FIG. 1-4, the present invention clutch assembly and damper arrangement 7 has a clutch assembly 10 and a damper 12. The clutch assembly 10 is a dual clutch assembly, however the present invention can also be utilized with a single clutch assembly. The clutch assembly 10 is mounted within a stationary frame 14. Rotatably mounted in the frame 14 is a clutch housing 16. The clutch housing 16 mounts an inner input shaft apply plate or piston 18. The piston 18 has apply chamber seals 20 and 22.

A spring plate 24 biases the piston 18 to a non-applied position. The piston 18 is selectively actuated by pressurized hydraulic fluid flowing through a passage 26. The passage 26 is fluidly connected with a fluid port 28. When the piston 18 is actuated, it engages a friction pack provided by separator plates 30 and friction discs 32. A spline portion 64 (FIG. 2) of the housing torsionally connects the separator plates 30 with the clutch housing 16. A backup plate 34 is retained to the clutch housing 16 by retainer ring 36. The friction discs have a spline connection with a clutch output hub 38. The hub 38 is splined to an inner diameter transmission input shaft 40. Actuation of the piston 18 causes the clutch housing 16 to be torsionally connected with the input shaft 40.

The clutch assembly 10 has a fixably connected hub 42. The hub 42 has a spline connection with a series of divider plates 44 and an end plate 46. Juxtaposing the divider plates 44 are friction discs 48. An apply plate or piston 50, that is biased by a series of retainer springs 52, is provided to engage the friction pack provided by the divider plates 44 and the friction discs 48. Seals 47 and 49 seal an apply chamber bordered by the piston 50. The friction discs 48 have a spline connection with a clutch output hub 53. The hub 53 is splined to an outer diameter transmission input shaft 54. Pressurized fluid flowing through a port 55 and through a passage 56 causes the piston 50 to engage the friction pack provided by the divider plates 44 and friction disc 48 to torsionally connect the housing 16 with an inner diameter transmission input shaft 40. Actuation of the pistons 18 and 50 are selectively independent of each other.

Figure 3:
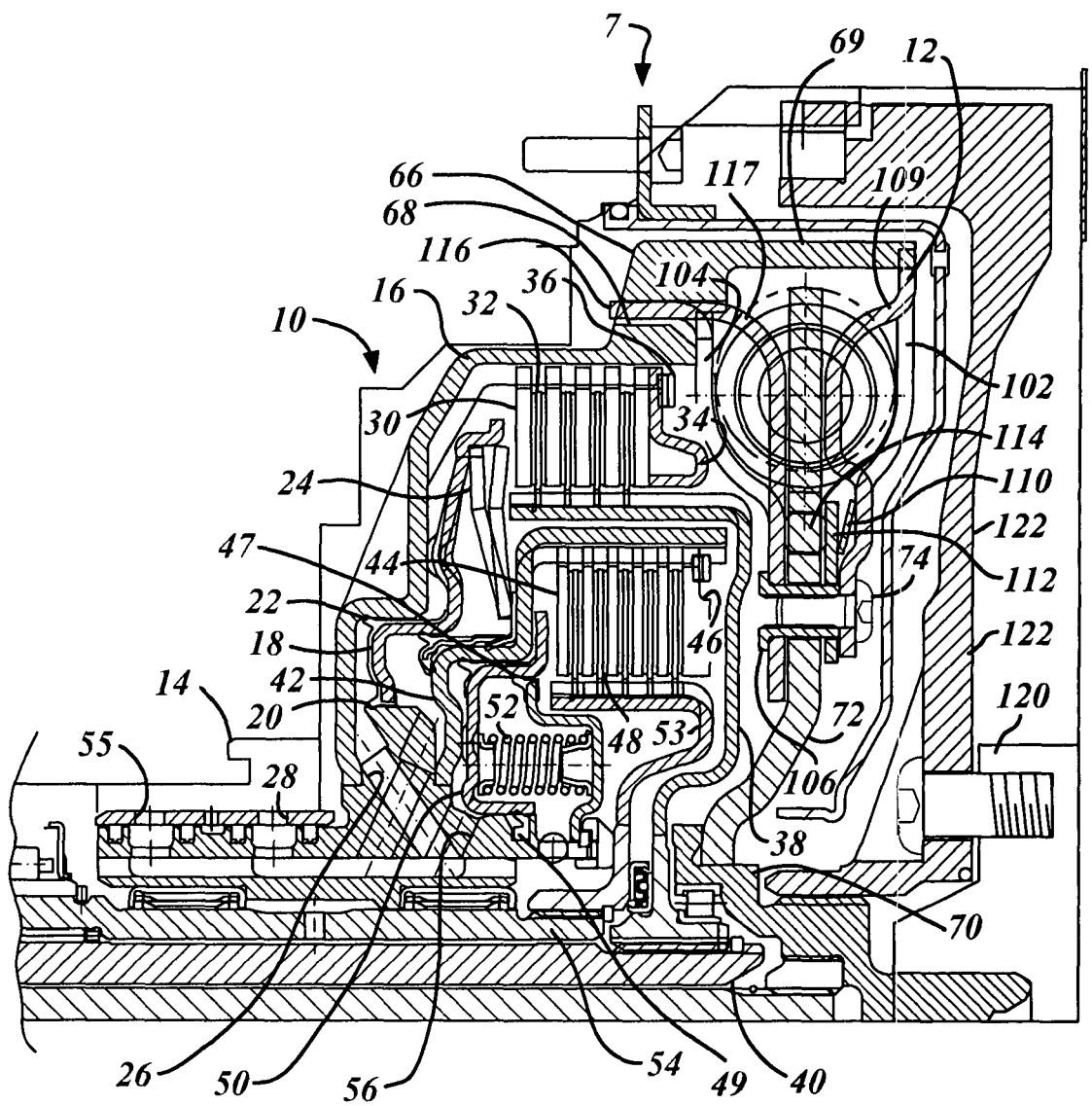
FIG. 3 is a sectional view of the clutch assembly and damper arrangement shown in FIGS. 1 and 2.

The housing 16 has a front extreme edge with a face 60. The face 60 has four geometrically spaced slots 62. As mentioned previously the housing 16 has a spline portion 64 that torsionally connects with the aforementioned separator plates 30. The housing 16 has a thickened portion 66 (FIG. 3). The thickened portion 66 has penetrating slots 68 that are generally axially extending in its major dimension. The slots 62 and 68 are radially aligned with the slots 62 being positioned radially outward from the slots 68. The slots 68 are radially intersecting with a projection of the spline portion 64. The housing 16 also has a spring support cylinder portion 69 that extends generally from the spline portion 64 to the extreme edge 60.

The damper 12 includes a driver element provided by an input hub having a core 70 and a hub plate 72. The hub plate 72 has three arcuate slots 75 for receipt of circumferentially spaced pins 74. The plate 72 has nine arcuate friction block slots 76. The hub plate 72 also has three compliance member posts 78.

The hub plate 72 is encircled by a compliance element comprised by a plurality of coil springs. As seen in FIG. 3, a right lobe 80 of the post penetrates a coil spring 82. The coil spring 82 is separated from adjoining coil springs 84 and 86 by a sliding block 88. A sliding block 90 separates coil springs 84 and 86 and coil springs 92 and 94. A sliding block 96 separates springs 92 and 94 from a coil spring 98. The coil spring 98 is fitted upon a left lobe 100 of a post 78. The above noted pattern of coil springs and sliding blocks is repeated between each separate post 78.

Coupled to the driver element is a driven element provided by a front shell 102 and a rear shell 104. The front and rear shells 102, 104 have three apertures 71 for receipt of connecting pins 74 and pin sleeves 106. The front shell 102 has three radial projections 108. The projections 108 fit within the slots 62 to form a torsional connection between the front shell 102 and the clutch housing 16 forward of the coil springs forming the compliance element and radially outward of the pins 74. The front shell 102 has three stamped out spring cages 109 abutting the springs 82 and 98.

Positioned adjacent the front shell 102 is a ring spring 110. The ring spring 110 abuts a push ring 112. The ring 112 provides a biasing force against friction blocks 114 that are captured within the slots 76. The rear shell 104 has three stamped spring cages 117. The rear shell 104 has three generally axial extending projections 116. The projections 116 extend into the slots 68 forming a torsional connection with the clutch housing 16 rearward of the coil springs of the compliance element and radially outward of the pins 74. The projection 116-slot 68 torsional connection extends axially reward of the backing plates 34 and 46.

In operation an engine powered crankshaft 120 turns a flywheel 122. The flywheel 122 turns the core 70 of the damper input hub. The hub plate 72 rotates causing the posts 78 to drive the compliance element provided by the coil springs. The coil springs transfer torque to the driven element provided by the front and rear shells 102, 104. Since the pins 74 can move in the slots 75, relative movement can exist between the driver and driven elements. Torsional vibration from the engine is absorbed in the compliance element. Additional torsional damping is provided by the action of the friction blocks 114 against the rear shell 104. The sliding blocks and coil springs are radially overlapped and directly exposed to and supported by of the clutch housing spring support portion 69. The driven element and the clutch housing 16 will torsionally turn in a unitary fashion due to the positioning of the projections 108,116 within the slots 62 and 68. The damper 10 is unrestrained in the forward axial direction due to the projection-slot arrangement of the damper and clutch housing. Accordingly, assembly of the damper 12 to the clutch assembly 10 is simplified.

While preferred embodiments of the present invention have been disclosed, it is to be understood it has been described by way of example only, and various modifications can be made without departing from the spirit and scope of the invention as it is encompassed in the following claims.

What is claimed is:

1. A clutch assembly and damper arrangement comprising:
a driver element;
a driven element coupled to said driver element by a plurality of springs, said driven element having front and rear shells, said shells having projections extending therefrom; and
a clutch selectively engageable to said driven element, said clutch having a housing supporting said springs and being torsionally unitary with said driven element with slots along an extreme forward face for receipt of said front shell projections and said housing having generally axially extending slots rearward of said springs for receipt of said rear shell projections.

2. A clutch assembly and damper arrangement comprising:
a driver element;
a driven element coupled to said driver element by a plurality of springs, said driven element having front and rear shells, said shells having projections extending therefrom and wherein said projections for said front and rear shells are radially aligned; and
a clutch selectively engageable to said driven element, said clutch having a housing supporting said springs and being torsionally unitary with said driven element with slots for receipt of said shell projections.

3. A clutch assembly and damper arrangement comprising:
a driver element;
a driven element coupled to said driver element by a plurality of springs, said driven element having front and rear shells, said front and rear shells being connected by a plurality of circumferentially spaced pins, said shells having projections extending therefrom; and
a clutch selectively engageable to said driven element, said clutch having a housing supporting said springs and being torsionally unitary with said driven element, said housing having slots for connective receipt of said shell front and rear projections radially outward of said pins.

4. A clutch assembly and damper arrangement comprising:
a driver element;
a driven element coupled to said driver element by a plurality of springs, said driven element having front and rear shells, said shells having projections extending therefrom;
a clutch selectively engageable to said driven element, said clutch having a housing supporting said springs and being torsionally unitary with said driven element with slots for receipt of said shell projections; and
wherein said front shell projections fit within a slot on a face of an extreme end of said clutch housing.

5. A clutch assembly and damper arrangement comprising:
a driver element;
a driven element coupled to said driver element by a plurality of springs, said driven element having front and rear shells, said shells having projections extending therefrom; a clutch selectively engageable to said driven element, said clutch having a housing supporting said springs and being torsionally unitary with said driven element with slots for receipt of said shell projections; and
wherein said front shell connects with said housing generally axially in front of said springs and said rear shell connects with said housing generally axially rearward of said springs.

6. A clutch assembly and damper arrangement comprising:
a driver element;
a driven element coupled to said driver element by a plurality of springs, said driven element having front and rear shells, said shells having projections extending therefrom;
a clutch selectively engageable to said driven element, said clutch having a housing supporting said springs and being torsionally unitary with said driven element with slots for receipt of said shell projections; and
wherein said clutch has a splined connection with a friction pack backing plate and a connection of said rear shell with said clutch housing extends axially rearward of said backing plate.

* * * * *